United States Patent [19]

Newman, IV

[11] Patent Number: 5,769,171

[45] Date of Patent: Jun. 23, 1998

[54] DIRT SCRAPER HAVING A HINGED FLOOR

[76] Inventor: W. Richard Newman, IV, 126 Camden Ct., Madison, Miss. 39110

[21] Appl. No.: 728,062

[22] Filed: Oct. 9, 1996

[51] Int. Cl.[6] .................................................. A01B 49/02
[52] U.S. Cl. ........................................ 172/200; 172/199
[58] Field of Search ................................ 172/200, 199; 37/445

[56] References Cited

U.S. PATENT DOCUMENTS

| | | | |
|---|---|---|---|
| 347,098 | 8/1886 | Evison | 172/200 X |
| 539,153 | 5/1895 | Thomas | 172/200 X |
| 621,584 | 3/1899 | Reeds | 172/200 |
| 1,368,585 | 2/1921 | Vigil | 172/199 X |
| 2,839,851 | 6/1958 | Geiszler | 172/199 X |
| 3,336,685 | 8/1967 | Keller | 172/199 X |
| 4,898,247 | 2/1990 | Springfield | 172/200 X |
| 5,265,681 | 11/1993 | Kincses | 172/199 X |
| 5,407,014 | 4/1995 | Tranmer | 172/200 X |

FOREIGN PATENT DOCUMENTS 0077850  5/1983  European Pat. Off. ............... 172/200

*Primary Examiner*—Terry Lee Melius
*Assistant Examiner*—Christopher J. Novosad
*Attorney, Agent, or Firm*—Breiner & Breiner

[57] ABSTRACT

A dirt scraping implement is provided including an external box-type body frame, a scraping blade, a hinged floor, and an activator for the hinged floor wherein packed dirt may be scraped and transported by relatively small farm machinery.

4 Claims, 1 Drawing Sheet

DIRT SCRAPER HAVING A HINGED FLOOR

FIELD OF THE INVENTION

This invention generally relates to farm implements. More particularly, the present invention relates to a farm implement having a combined box blade and hinged floor bottom.

BACKGROUND OF THE INVENTION

Farm implements are used to scrape, drag and level dirt and transport it to differing locations. For example, a singular piece of equipment has been used, such as the box blade, to scrape, drag, and level a surface. With such a box blade, however, it is not possible to cross an obstacle such as a cattle gap, driveway, yard, small ditch or uneven surface without loosing the dragged dirt or damaging the surface that was traversed.

A dirt slip may be used to transport and scoop loose material such as mulch or loose dirt, however many dirt slips are designed as light duty implements that are not capable of scraping packed dirt. By contrast, a dirt scraper has been used for larger scraping and transporting functions. Such implements are often very large and expensive and require the use of large tractors with multiple hydraulic outlets for proper usage. Such large scrapers are replete with shortcomings that detract from their usefulness, such as an inability to perform small dirt work jobs or provide an economically feasible farm implement capable of performing multiple functions.

The foregoing illustrates limitations known to exist in present farming implements. Thus, it is apparent that it would be advantageous to provide an improved farm implement directed to overcoming one or more of the limitations set forth above. Accordingly, a suitable alternative is provided including features more fully disclosed hereinafter.

SUMMARY OF THE INVENTION

The present invention advances the art of farm implements, and the techniques for creating such farm implements, beyond which is known to date. In one aspect of the present invention a scraping implement is provided comprising an external box-type body frame, a scraping blade, a hinged floor, and a means for activating the hinged floor.

It is, therefore, a purpose of the present invention to provide one scraping implement that will perform scraping and transporting functions at an affordable cost.

It is a further purpose of the present invention to provide a scraping implement for small jobs which will function with smaller tractors having limited hydraulic outlets.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
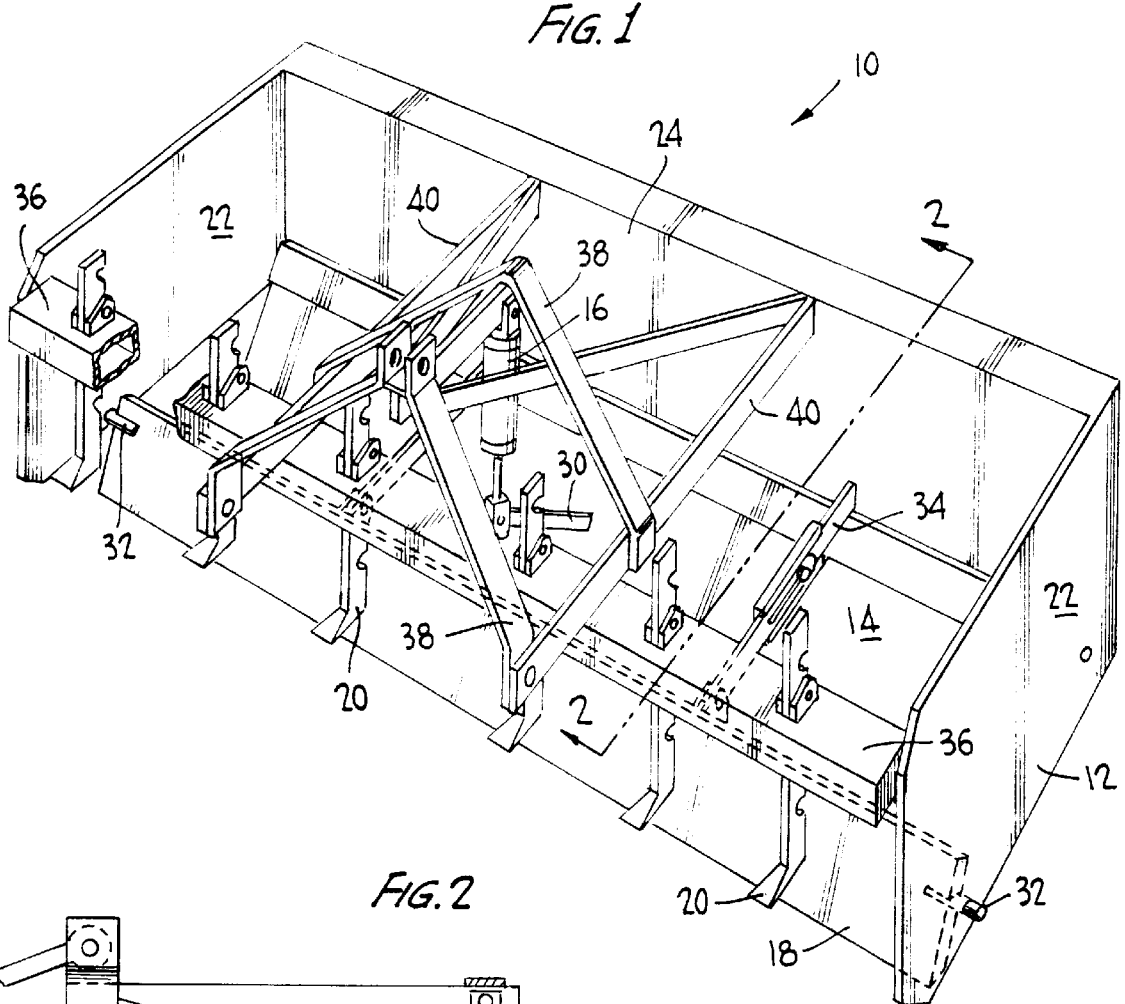
FIG. 1 is a perspective view of the present invention.
Figure 2:
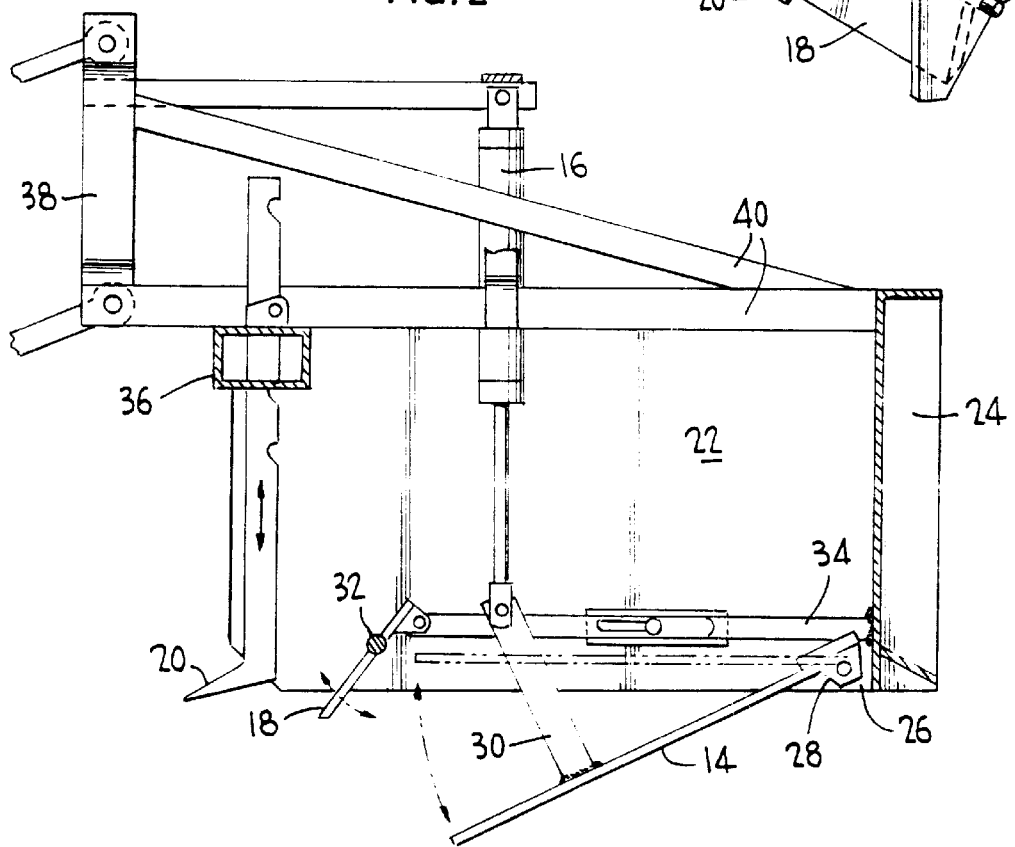
FIG. 2 is a cross sectional side view of the present invention taken along line 2—2 of FIG. 1.

Referring now to the drawings, wherein similar reference characters designate corresponding parts throughout the several views, the hinged floor scraping implement of the present invention is generally illustrated at 10 in FIG. 1. The scraping implement includes an exterior body frame 12, a rotatably mounted or hinged floor 14, an activating means 16 for lowering the hinged floor 14, a cutting blade 18, and breaking tines 20.

Turning to FIG. 1, the exterior body frame 12 comprises side plates 22 and a back plate 24. The length of the back plate 24 between the side plates 22, also the width of the scraping implement, can be dimensioned, preferably in the range of 5–7 feet, in order to accommodate tractors of differing horsepower. A hinge mount 26 is formed near the lower edge of the back plate 24 and side plate 22 and supports the hinge 28 of the hinged floor 14. The hinged floor 14 is rotatably connected to the exterior body frame 12 near the back plate 24. A floor support 30, preferably fixed in the center of the hinged floor 14, connects the hinged floor 14 to the activating means 16. The activating means 16 is preferably a hydraulic cylinder with an eight inch stroke that, when activated, opens downwardly the hinged floor 14. In a preferred embodiment, the activating means may be operated from a tractor to open or close the hinged floor 14.

The cutting blade 18 is connected at its longitudinal ends to each side plate 22 at blade hinge 32. Blade supports 34 anchor the cutting blade 18 to the exterior body frame 12 and, if the length of the blade support is varied, determine the angular placement of the cutting blade. Preferably, two pieces of half inch flat bar support the cutting blade 18.

Breaking tines 20 may be mounted at the front of the scraping implement 10 and supported by a breaking tine support 36 mounted to the exterior body frame 12. The breaking tines may be notched, as shown, to vary their height with respect to the cutting blade 18. A-frame supports 38, connected to pulling supports 40, fix the activating means 16 and allow it to open or close the hinged floor 14. Pulling supports 40 provide overall structural rigidity and facilitate connection of the scraping implement to a tractor or other pulling machine.

As will be apparent to one skilled in the art, various modifications can be made within the scope of the aforesaid description. Such modifications being within the ability of one skilled in the art form a part of the present invention and are embraced by the appended claims.

It is claimed:

1. A scraping implement comprising an exterior body frame having first and second side plates and a back plate wherein the back plate is fixed perpendicularly to the side plates to define a box having a bottom plane, a cutting blade having longitudinal ends wherein said ends are fixed to the exterior body frame, a floor hingedly fixed in said bottom plane and connected to the exterior body frame, an activating means to move the floor downward out of the bottom plane, and a floor support having a first end and a second end, the first end being fixed to the floor and the second end being fixed to the activating means.

2. The invention of claim 1 wherein the activating means is a hydraulic cylinder.

3. The invention of claim 1 wherein the scraping implement further comprises a breaker tine support connected to the exterior body frame and at least one breaker tine fixed on the breaker tine support.

4. The invention of claim 1 wherein the hinged floor has a longitudinal midpoint and wherein said first end is fixed to the hinged floor at substantially said midpoint.

* * * * *